INVENTORS B. J. JENKINS
A. R. MORLEY
BY E J Olinder
ATTORNEY

United States Patent Office 3,334,190
Patented Aug. 1, 1967

3,334,190

CENTRALIZED REPERTORY SYSTEM FOR MULTI-FREQUENCY SIGNALING TELEPHONES

Bobbie J. Jenkins, Eatontown, and Alfred R. Morley, Keansburg, N.J., assignors to Bell Telephone Laboratories, Incorporated, New York, N.Y., a corporation of New York Filed July 9, 1964, Ser. No. 381,381
15 Claims. (Cl. 179—18)

Figure 1:
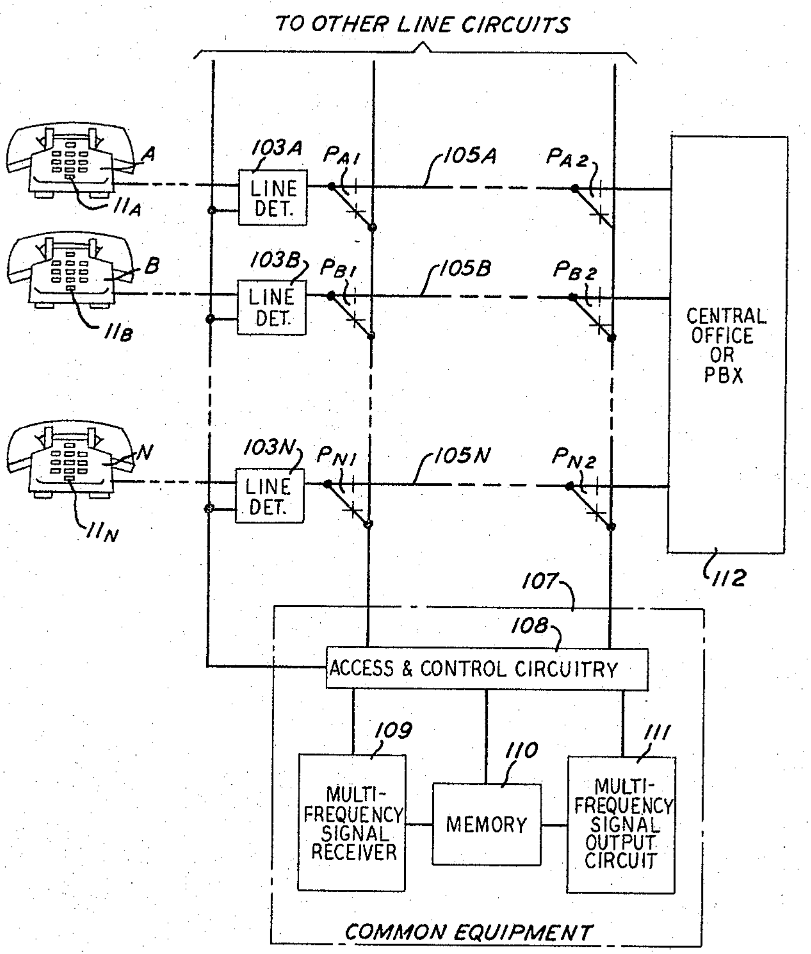

This invention relates to telephone repertory dialing apparatus and more specifically to concentrated or centralized repertory equipment that is shared by a group of telephone subscribers.

Repertory dialing arrangements are well known in the telephone art and may be classified in terms of three general types. A first type provides each telephone subscriber with his own repertory dialer unit which typically includes a storage medium, such as a magnetic drum for example, signaling apparatus and associated logic circuitry, all of which may be combined in an integral unit with a telephone set, as shown for example by R. A. Miller and C. M. Taris in application Ser. No. 202,563, filed June 14, 1962. There are substantial disadvantages involved in that type of a repertory dialer system, however, inasmuch as each subscriber must be provided with an additional unit of station apparatus and such equipment is relatively complex and accordingly expensive. As a result, a subscriber must pay a considerable premium for the obvious advantages of convenience and speed that repertory dialing affords.

A second type of telephone repertory dialer would appear to avoid the disadvantage of costly per line equipment by locating common storage means, signaling means and the logic circuitry associated therewith at the central office. This equipment is shared by a number of subscribers, thereby reducing per line equipment cost. A repertory dialer arrangement of this type employing a central office memory is disclosed by W. A. Malthaner and H. E. Vaughan in Patent 2,951,908, issued Sept. 6, 1960. The apparent cost advantages of such a repertory system are in effect set off, however, by the necessity for substantial modification to the central office switching equipment in order to attain compatibility between such equipment and the repertory system.

A third type of repertory dialer arrangement appears to offer some promise of avoiding the stated disadvantages of the two repertory dialer forms noted above. In lieu of locating the necessary repertory equipment either at the subscriber's premises or at the central office, an intermediate location may be selected for the installation of common equipment which is used by a group of subscribers, twenty to fifty for example, on a shared basis. Compatibility with conventional central office switching equipment is maintained. Equipment of this general form is shown, for example, by R. Truby in his application Ser. No. 354,550, filed Mar. 25, 1964.

Despite the evident advantages of the centralized or common form of repertory dialing system, these advantages have not heretofore been fully realized in that the common equipment employed is typically unduly complex which has resulted in costs that are unacceptably high and in reliability which is undesirably low.

Accordingly, a general object of the invention is to simplify telephone repertory dialer equipment of the centralized or common type.

Another object of the invention is to reduce the cost of centralized repertory dialer equipment.

An additional object is to eliminate any need for modifying central office equipment serving centralized repertory dialer installations.

These and other objects are achieved in accordance with the principles of the invention by a centralized repertory dialing system, particularly adapted for multifrequency or TOUCH-TONE signaling that employs a number of unique concepts pertaining to the processing and storing of signals, to the particular manner in which the common equipment is shared by the participating subscribers, and to the logic circuitry that governs the interrelation thereof.

More specifically, in accordance with the invention, the apparatus shared by the subscribers comprises per line OFF-HOOK detection equipment and common equipment. The common equipment may be subdivided into access circuitry, memory and output circuitry. The procedure for making an abbreviated dialing call is to take the handset OFF-HOOK, operate a single additional provided "repertory" button on an otherwise conventional multifrequency signaling or TOUCH-TONE subset followed by the actuation of one of the ten digit buttons to indicate a particular one out of a group of ten to approximately fifty stored directory numbers. Solid state access circuitry uniquely associates the identity of the calling subscriber and the digit button and selects the appropriate directory number stored in the memory. Following this selection, outpulsing takes place; at the completion of this processing, the equipment releases itself from the calling subscriber's line.

In accordance with one aspect of the invention, common equipment usage is held to a minimum by providing for the automatic release of the common equipment upon the occurrence of any one of several conditions. Thus, for example, if the first multifrequency signal transmitted after OFF-HOOK is one of the conventional ten digits, indicating that a normal rather than a repertory call is being initiated, release will occur. Common equipment is also released automatically after the occurrence of a preselected interval following the detection of an OFF-HOOK condition unless this condition is followed by dial tone or by the special repertory signal. This situation arises when an incoming call is being answered. The common equipment is also released at the completion of the outpulsing of a number stored in the repertory and also when the set goes back ON-HOOK.

In accordance with another aspect of the invention, conventional nonrepertory telephone service remains unaffected. Thus, for example, all participating lines can be in simultaneous use for talking and nonrepertory dialing but only one line at a time has the use of the repertory feature. If a request for repertory service is transmitted over a line while another line is connected to the equipment, the second request is ignored, which is to say that all other lines are "locked out." Lock-out is attained uniquely by utilizing a pnpn device to monitor requests for repertory service.

OFF-HOOK detection is accomplished in accordance with the principles of the invention by utilizing the step change in line current that corresponds to OFF-HOOK action to switch an individual line circuit transistor to the conducting state. The resulting potential that is temporarily placed across a pnpn threshold device is employed to operate a line relay which in turn establishes the necessary connecting path between the common equipment and the OFF-HOOK set.

In accordance with the invention, the common equipment memory utilizes magnetic cores for storage. A directory number is stored in the memory by the core threading pattern of a single lead. In the "write" cycle the memory lead is pulsed to set all of the associated cores. Output is then achieved by sequentially pulsing each core column. Output signals which occur on row leads are then employed to operate frequency switches in a multifrequency pulse generator circuit.

Accordingly, one feature of the invention pertains to a concentrated repertory dialing system utilizing multifrequency signaling wherein the only modification required for a subscriber's station set is the addition of a single pair of multifrequency signal generating means.

Another feature of the invention resides in the employment of a first distinctive multifrequency signal generated by a station set to establish access to a concentrated repertory memory circuit and in the employment of a second distinctive multifrequency signal generation by a station set to initiate the subsequent generation of a plurality of multifrequency signals indicative of a multidigit directory number stored in the memory circuit.

An additional feature of the invention relates to the detection of an OFF-HOOK condition at one of the station sets in a telephone concentrated repertory system by means of pnpn threshold devices without introducing additional impedances in the line.

A further feature lies in the combination of OFF-HOOK detection means of the form indicated in a centralized repertory dialing system with lock-out circuitry which employs solid state threshold devices to limit access to the repertory common equipment at any particular time to a single subscriber.

Still another feature concerns an arrangement in a centralized repertory multifrequency signaling system for selecting pairs of signal frequencies by means of solid state switching devices.

Figure 7:
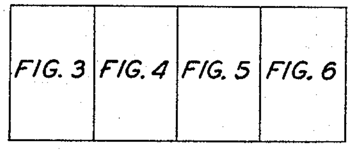
Figure 2A:
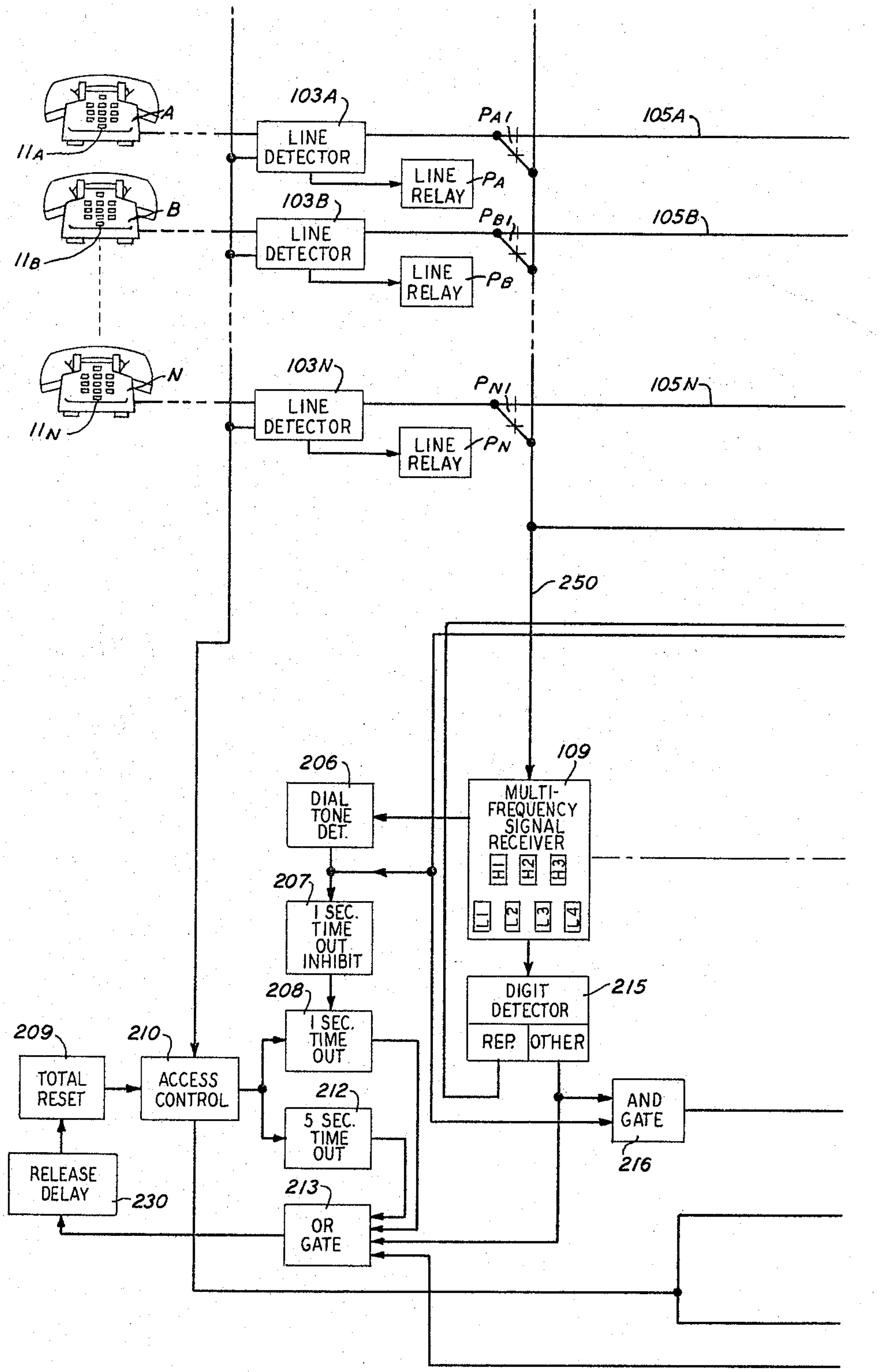
Figure 2B:
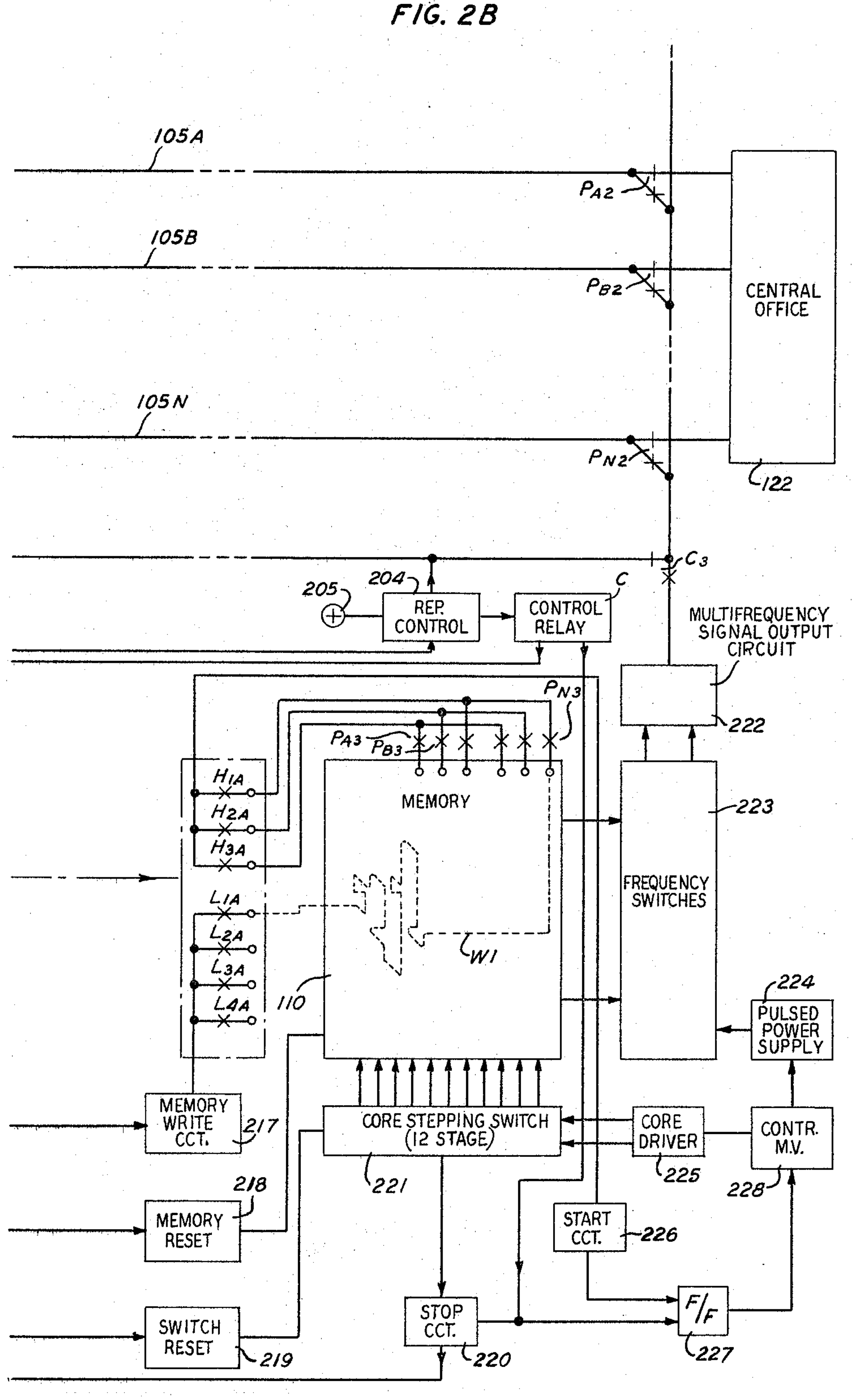

The principles of the invention together with additional objects and features thereof will be fully apprehended from the following detailed description of an illustrative embodiment and from the appended drawing in which:

FIG. 1 is a simplified block diagram of a concentrated repertory dialing system in accordance with the invention;

FIGS. 2A and 2B together present a complete block diagram of the system shown in skeletonized form in FIG. 1;

FIGS. 3 through 6 present a schematic circuit diagram of the equipment shown in FIGS. 2A and 2B; and FIG. 7 is a block diagram showing the interrelation of FIGS. 3 through 6.

The simplified block diagram of a concentrated repertory system shown in FIG. 1 includes a plurality of station sets A, B . . . N. These sets may be conventional TOUCH-TONE type telephones each modified, as shown, to include an eleventh button $11_A$, $11_B$ and $11_N$, respectively, to provide for the generation of an extra coincident pair of multifrequency signals which, in accordance with the invention, is employed to call in the centralized common repertory equipment 107. Sets A, B and N are associated, respectively, with line detectors 103A, 103B and 103N and each is connected through to central office or PBX 112 by a corresponding one of the subscriber's loops 1005A, 105B and 105N. Sets A, B and N may also be connected through to central office 112 by way of common repertory equipment 107 through the operation of line relays, shown in FIG. 2, that operate contacts $P_{A1}$, $P_{A2}$, $P_{B1}$, $P_{B2}$, $P_{N2}$ and $P_{N2}$.

Common equipment 107, which includes four major units, may be located at any point through which all lines served are conveniently routed. In the case of a PBX or Key System, a location near to the switching equipment would normally be suitable. In an apartment building a basement location would be convenient and for scattered subscribers using common repertory equipment its physical location might be at the central office, although the repertory system would be self-contained. Receiver 109, one of the four units of common equipment 107, is employed to detect the multifrequency or TOUCH-TONE signals generated by the associated station sets, which signals include the repertory signals indicated above as well as conventional digit signals. Memory 110 provides a means for permanently storing the directory numbers that are to be made available on a repertory basis to each of the participating telephone sets. Access to memory 110, which is controlled by access and control circuitry 108, is accomplished by combining the output of multifrequency signal receiver 109 with that of one of the line detectors 103A, 104A or 104N. Multifrequency signal output circuit 111 is driven by the output of memory 1110 and transmits the complete directory number in the form of multifrequency or TOUCH-TONE signals to central office 112. Access and control circuit 108, in addition to controlling access to memory 110 provides lockout when the equipment is busy, time-out and reset functions. Common repertory equipment 107 automatically times-out after some brief preselected period, such as one second for example, after OFF-HOOK is detected, unless this is followed by dial tone or the repertory signal within the one second interval. This situation arises when an incoming call is answered. If dial tone is detected, or if the repertory signal is detected, within the one second period, the time-out is automatically delayed for a preselected interval such as five seconds. Time-out action is described in detail below in connection with the descriptions of FIGS. 2A, 2B and 3 through 6.

A full description of the detailed block diagram of the illustrative repertory system of FIGS. 2A and 2B including a description of the function and operation of each of the equipment units shown therein may best be presented in terms of an explanation of a typical operating sequence. When one of the system telephone sets, such as set A for example, goes OFF-HOOK, the resulting signal is detected by line detector 103A which causes the operation of its line relay $P_A$ unless the common equipment is busy, in which case line relay $P_A$ is locked out. The specific manner in which lockout is achieved is explained in detail below in connection with the explanation of FIG. 3. Assuming that the common equipment is not busy, operation of line relay $P_A$ results in the input terminals of receiver 109 being bridged across line 105A by the operation of relay contacts $P_{A1}$. The connection between telephone set A and central office 112 is not yet split, however, but is instead maintained over a pair provided by the common equipment.

With the operation of line relay $P_A$, access control circuit 210 operates and, in turn, initiates timing action by a one second time-out circuit 208 and by a five second timeous circuit 212. Either of these two circuits can cause release of the common equipment by transmitting a signal to access control circuit 210 by way of OR gate 213, release delay circuit 230 and total reset circuit 209. The one second time-out circuit 208 can be inhibited, either by a signal from dial tone detector 206 or by repertory control relay C which, as explained hereinbelow, operates when a repertory signal is received. The common equipment is also released by access control circuit 210 if the first TOUCH-TONE signal is indicative of a decimal digit rather than a demand for repertory service.

If the first TOUCH-TONE signal generated by telephone set A is a repertory (REP) signal, generated by the operation of the eleventh TOUCH-TONE button, a pulse is transmitted to repertory control circuit 204, which in turn operates repertory control relay C; transfer contacts $C_3$ of relay C operate to split the connection.

Battery 205 is supplied to telephone set A and the line is held by connecting it through to multifrequency signal output circuit 222. Output circuit 222 is substantially identical to the circuit of a conventional TOUCH-TONE telephone with one of the pushbuttons operated, with the exception that the frequency contacts are not yet closed. Thus, in addition to holding the line, the circuit is ready to transmit multifrequency signals corresponding to any selected one of the stored directory numbers. Repertory control relay C, by contacts not shown, also inhibits the path from digit detector 215 to OR gate 213 so that the decimal digit received following the REP signal does not result in releasing the common equipment.

The operation of a single TOUCH-TONE type digit button on telephone set A results in the generation of a coincident two-tone signal indicative of a particular digit in terms of a conventional 3×4 multifrequency code which corresponds to a particular directory number stored in memory 110. This signal is applied to the input of receiver 209 by way of lead 250. In conventional fashion, a corresponding pair of relays in receiver 109, one of the high frequency relays $H_1$ through $H_3$, and one of the low frequency relays $L_1$ through $L_4$, is operated. The operation of these relays together with the operated line relay uniquely identifies the stored directory number.

As will be described in further detail below, storage of a directory number in memory 110 is achieved by threading a single lead in a unique path through a matrix of ferrite memory cores. There is one lead, such as lead W1, for each telephone number stored. Current pulsed from memory write circuit 217 is sent through the particular memory lead selected. This step is termed "writing" into the memory inasmuch as the current pulse "sets up" or changes the magnetic state of all of the cores threaded by the selected memory lead.

Immediately after writing, memory 110 is "read." Reading consists of applying current pulses successively by way of core stepping switch 221 along adjacent vertical leads in the memory matrix. A sequence of pulses results on the horizontal leads of memory 110 which in turn energize selected switches in an array of frequency switches 223, which action completes the proper connections to form signal frequency generating circuits, thereby producing corresponding outputs from multifrequency signal output circuit 222.

The rate of reading memory 110 is controlled by multivibrator 228 which is started by the receipt of the digit signal by way of start circuit 226 and flip-flop 227 so that reading follows immediately after writing. At the completion of reading, stop circuit 220 stops the operation of multivibrator 228 by applying a stop signal to flip-flop 227. Stop circuit 220 also sends pulses back to OR gate 213, resulting in the release of the common equipment in the manner previously described. Inasmuch as the call may be abandoned before completion, memory 110 and stepping switch 221 are reset immediately through respective reset switches 218 and 219.

Illustrative detailed circuitry for each of the equipment blocks of FIG. 2 is shown in the schematic circuit diagram of FIGS. 3 through 6. An explanation of this circuitry is presented in terms of the following description of a complete operating sequence similar to that presented above in connection with the description of FIG. 2.

As telephone set N goes OFF-HOOK, the resulting step change in the line current produces a pulse in transformer TR which is applied to the base of transistor Q1 by way of resistor R101, causing transistor Q1 to turn on. A positive potential which may be on the order of 48 volts, for example, is thus placed across the two-terminal crosspoint CP1. Crosspoint CP1 is a pnpn threshold device of a conventional type that conducts when the potential across it exceeds some preselected level such as 30 volts, for example. Crosspoint CP1 maintains its conductive state until the current through it is reduced to some preselected minimum level.

When crosspoint CP1 conducts, an operating path for line relay $P_N$ is completed. Holding current for relay $P_N$ is provided by way of the common crosspoint bus CB, crosspoint CP1, diode D101 and power supply PS1. The level of this holding current, which exceeds the minimum value needed to maintain crosspoint CP1 conducting, is such that the voltage at the common crosspoint bus CB is less than some preselected value such as 30 volts. It is this decrease in voltage that locks out the other line circuits, such as those corresponding to set A and set B in FIGS. 1 and 2, inasmuch as a voltage in excess of 30 volts is required on bus CB for any line circuit to gain access. The flow of current in crosspoint bus CB is applied to the base of transistor Q5 in access control circuit 210, turning transistor Q5 on. The resulting rise in voltage on the collector of transistor Q5 is applied by way of resistor R116 to the base of transistor Q6, turning transistor Q6 on. At this point, the collector of transistor Q6 goes to ground. Transistor Q6 is in effect shared by the one second time-out circuit 208 and by the five second time-out circuit 212.

Transistor Q4 in the one second time-out circuit 208 is normally on and when transistor Q6 is turned on in the manner described, the resulting change in current on its base, which is supplied by way of diode D104, capacitor C103 and diode D105, turns transistor Q4 off for a period of time established by resistor R111 and capacitor C103.

In similar fashion, transistor Q2 in the five second time-out circuit 212 is normally on and is turned off by the operation of transistor Q6 for a period of time established by resistor R104 and capacitor C102. At the termination of the one second time-out period, transistor Q4 conducts, and its collector goes to ground which removes the base current from transistor Q3 in OR gate 213. As a result, transistor Q3 turns off, and its collector voltage rises, applying base current to transistor Q12 in release delay circuit 230.

Transistor Q12 is normally on and is turned off by the start of either the one second or five second timeout. At this point, the voltage on the collector of transistor Q12 rises and charges capacitor C105. Transistor Q10 is also normally on. When base current is supplied by transistor Q3, turning transistor Q12 off, the collector of transistor Q12 goes to ground and the voltage across capacitor C105 causes transistor Q10 to turn off for a period determined by resistor R190 and capacitor C105. Voltage at the collector of transistor Q10 rises and supplies base current to transistor Q7 in the total reset circuit 209 by way of diode D140 and resistor R195. The collector of transistor Q7 goes to ground, diverting current from the line circuit which renders crosspoint CP1 nonconducting, thus releasing the system.

The one second time-out operation is inhibited by the reception of dial tone. Dial tone is detected by dial tone detector circuit 206 which comprise transistors Q13, Q14 and Q15 and associated circuit components. Dial tone is first detected by multifrequency receiver 209 which may be of the general type disclosed by F. T. Boesch, D. H. Nash and L. Schenker in Patent 3,128,349, issued April 7, 1964, and the detected signal is applied to the base of transistor Q15 by way of resistor R143. Transistor Q15 amplifies the signal; voltage is built up across the total circuit and the voltage on the collector of transistor Q15 which is applied to the base of transistor Q14, turns transistor Q14 on, bringing its collector close to ground potential. This action turns on transistor Q13 and its collector approaches full line voltage which may be 48 volts, for example, thus supplying base current to transistor Q16 in the one second time-out inhibit circuit 207. Transistor Q16 turns on which diverts the base current of transistor Q4 in one second time-out circuit 208, thus preventing the one second time-out from affecting the state of OR gate 213.

One second time-out is also inhibited by the action of control relay C. Make contact $C_6$ in AND gate 216 grounds the base of transistor Q4 and thus inhibits the one second time-out from affecting the state of OR gate 213.

The system may also be released through OR gate 213 by the operation of make contact $D_2$ of the D or digit relay which completes a path through the unoperated back contact $C_4$ of relay C to ground. These last named contacts correspond to the block labeled "Other" ((FIG. 2) which is a part of digit detector 215. Conditions controlling the operation of relays C and D are described in detail hereinbelow.

If the first TOUCH-TONE or multifrequency signal is a REP signal it is recognized by receiver 209 and a particular pair of the H and L relays such as H3 and L4 are operated thereby closing make contacts $H_{3B}$ and $L_{4B}$, which results in the operation of relay C, which locks itself up over contacts $C_1$ and $C_2$ in the repertory control circuit 204. At this point, the line connection from central office 112 to telephone set N is split by the operation of transfer contacts $C_3$ and $C_5$. The path to ground through break contact $C_4$ is opened and as a result the operation of digit relay D can no longer release the system.

The recognition of a decimal digit signal from telephone set N by receiver 209 is evidenced by the operation of one of the relays H1 through H3 in the high frequency group and one of the relays L1 through L4 in the low frequency group, excluding, however, the combination of relays H3 and L4 that is responsive to the REP signal, in accordance with conventional multifrequency signal receiver operation. The resulting operation of one of the make contacts $H_{1B}$ through $H_{3B}$ and one of the make contacts $L_{1B}$ through $L_{4B}$ completes an operating path for digit relay D. The operation of make contact $D_1$ completes an operating path for memory write circuit 217 which comprises a conventional monostable multivibrator utilizing transistors Q8, Q9 and associated components. This multivibrator establishes a delay period, the duration of which is determined by resistor R123 and capacitor C104. The positive output pulse from the collector of transistor Q9, is applied to pnpn transistor Q17, causing Q17 to condut. The resulting discharge current of capacitor C107 flows through crosspoint switch CP3 and thence by way of resistor R191 and one of the make contacts $L1_A$ through $L4_A$ and through the corresponding memory lead, such as lead W1, whose path through the magnetic cores of memory 110 is indicative of the desired directory number.

Figure 3:
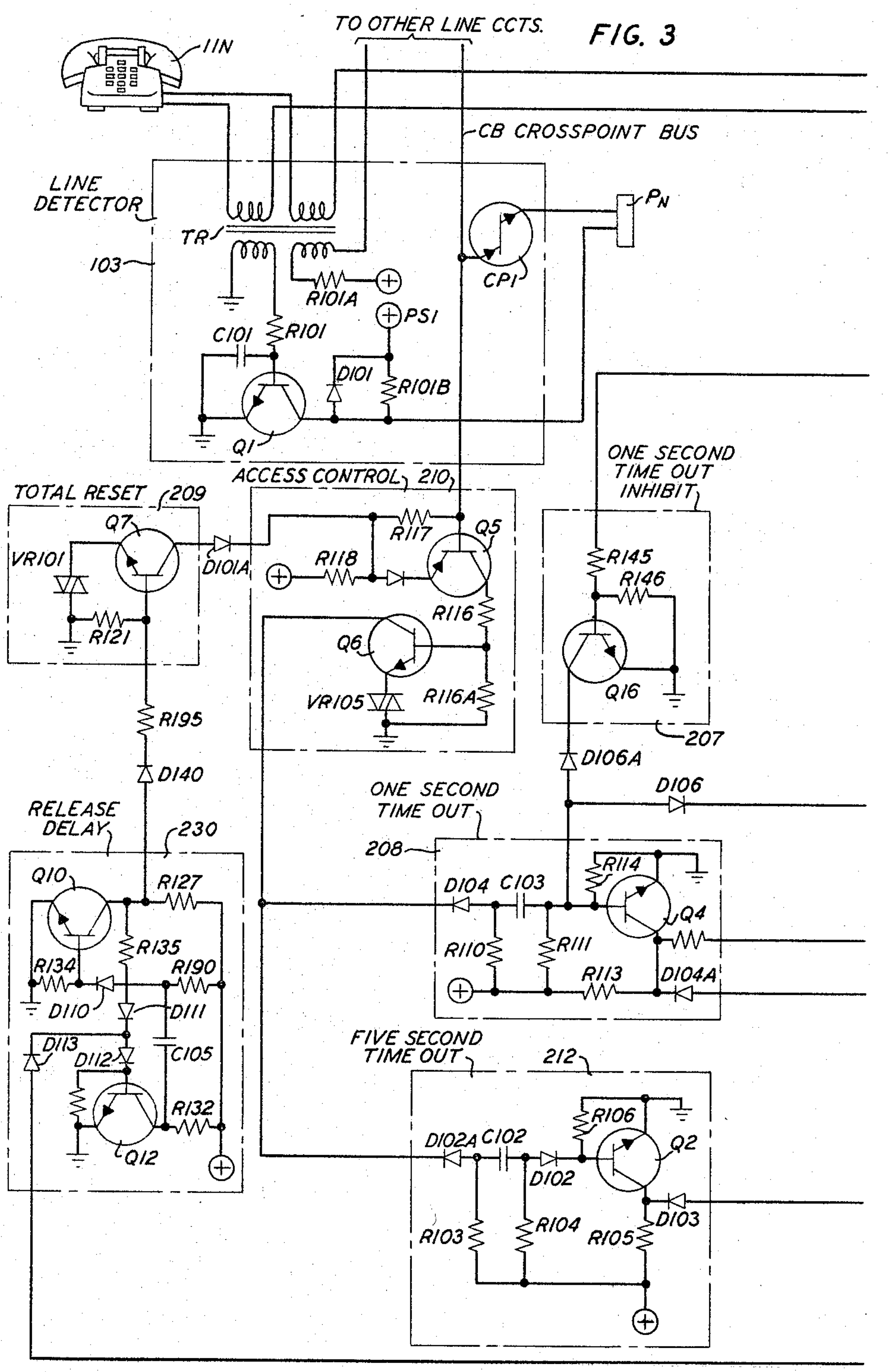
Figure 4:
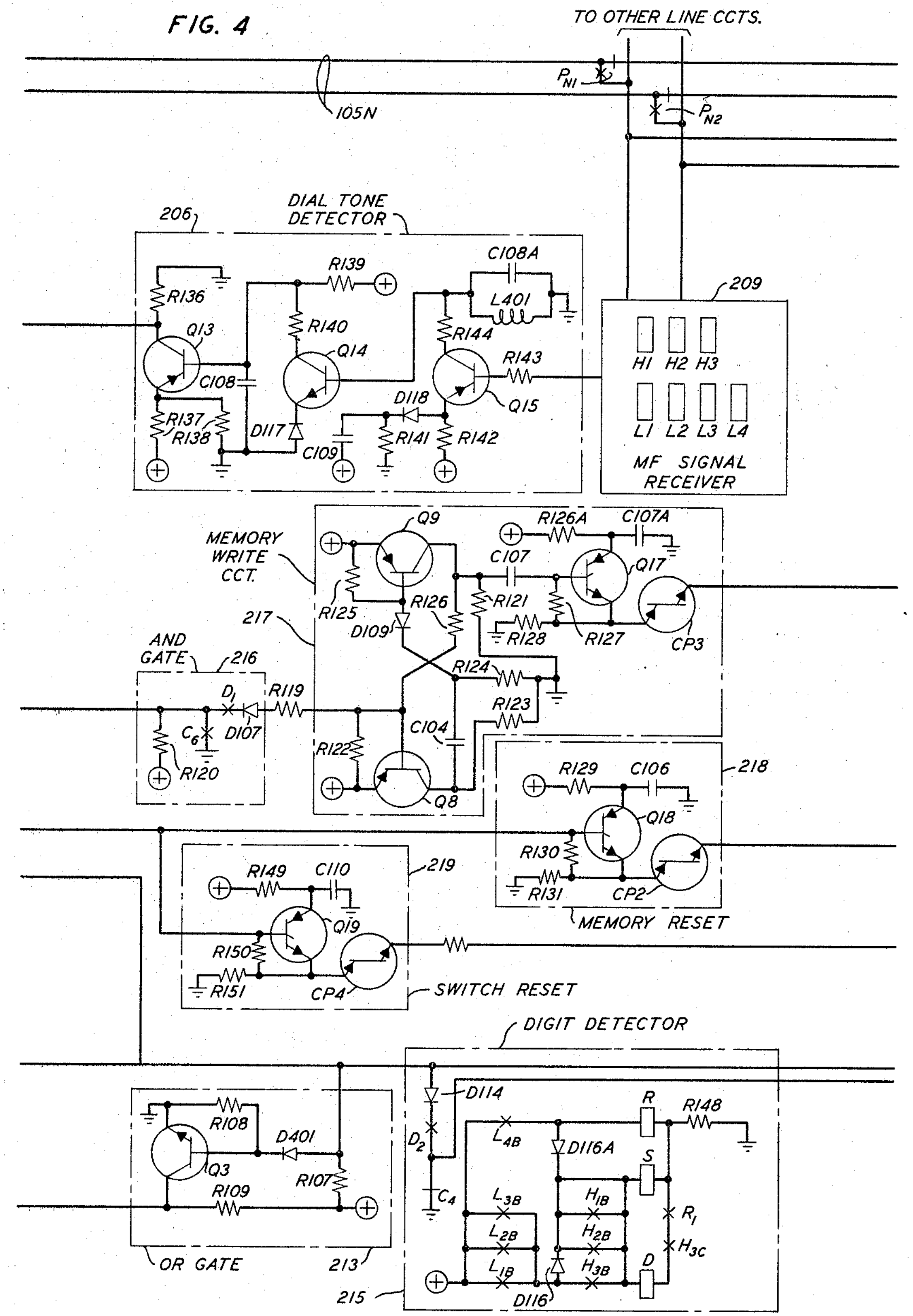
Figure 5:
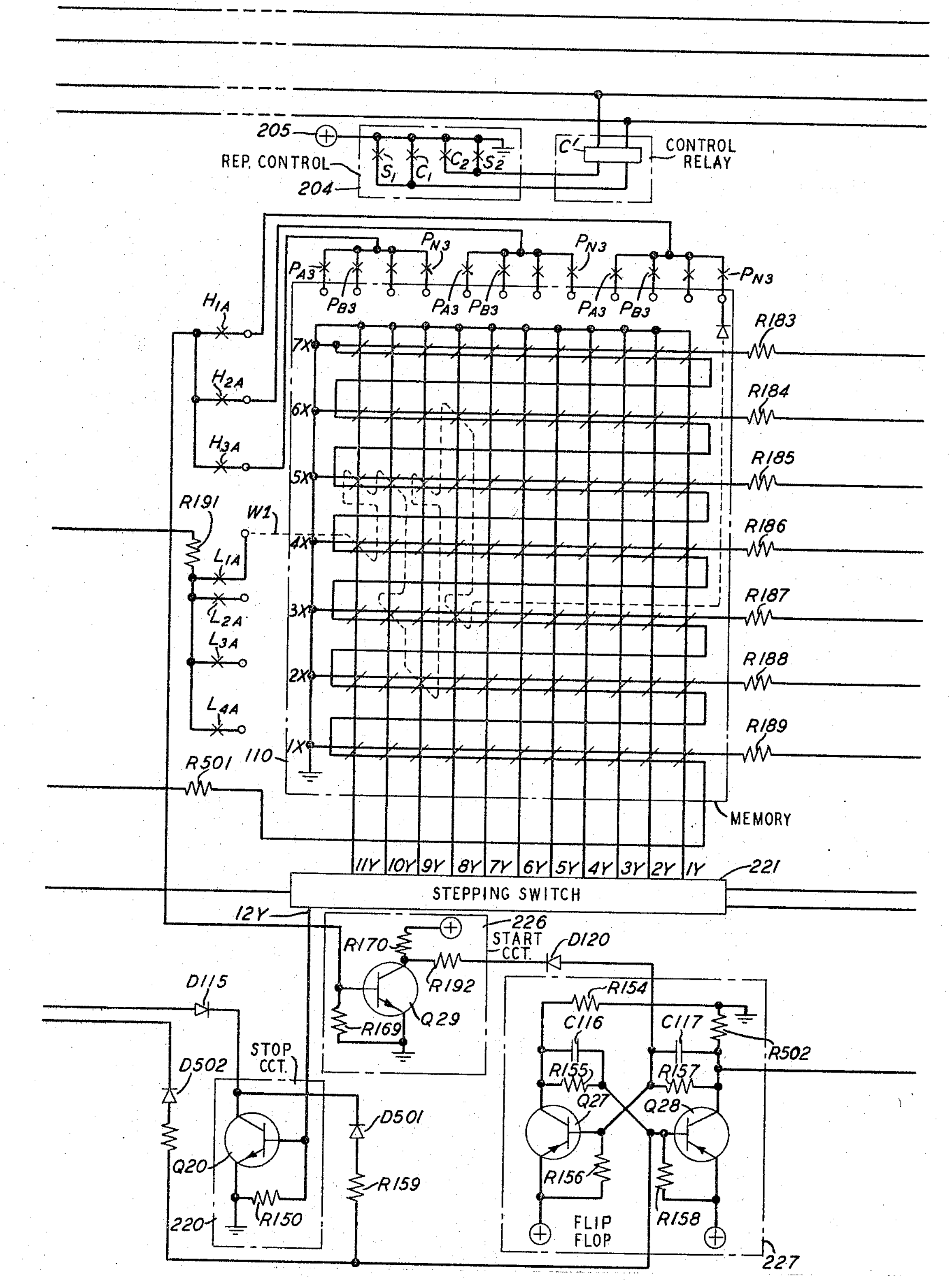
Figure 6:
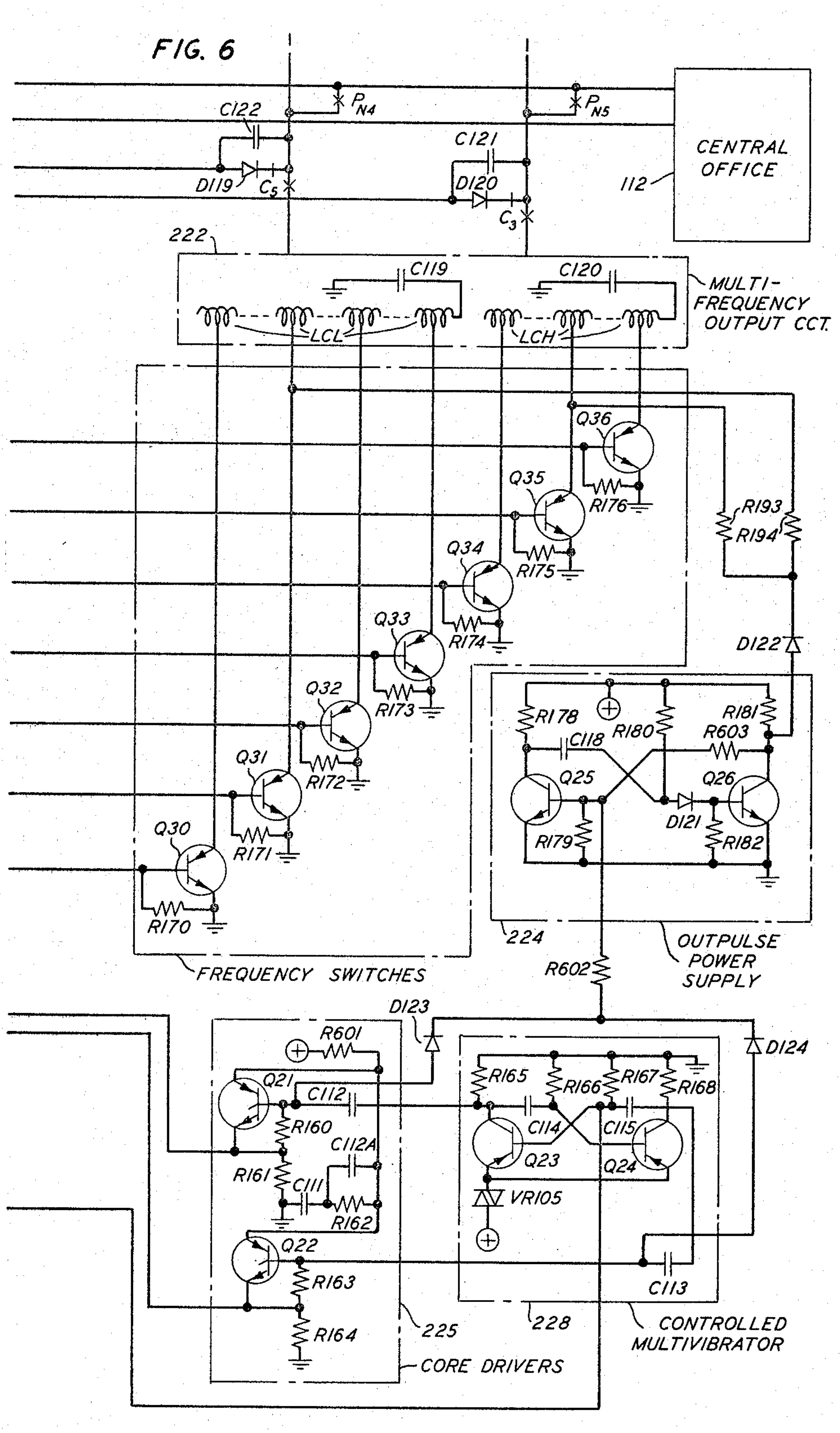

Memory 110, in the particular form shown in FIG. 3, is capable of storing numbers that have up to eleven digits. There are eleven columns, 1Y through 11Y and seven rows, 1X through 7X. Each row is associated with one output or frequency of multifrequency receiver 209. It is in memory 110 that the single digit denoting the address of the number to be called, and the multidigit number itself are intermingled. Closure of one of the four high relays H1 through H3 and one of the low relays, L1 through L4 and one of the line relays $P_A$ through $P_N$, provides a continuous path to ground from memory write circuit 217 through one and only one memory lead, such as lead W1. Each memory lead, such as lead W1, is threaded through two cores on each vertical, one of these two cores representing the low frequency and the other the high frequency of each digit of the number to be outpulsed. Thus, the lead shown in FIG. 5 would be used if subscriber N had transmitted the REP signal followed by a "1" (L1 and H1). The directory number stored is (L1 H3) (L2 H3) (L3 H3) and (L2 H2), denoting 3695.

Following a write pulse through lead W1, successive current pulses sent up the vertical wires 1Y through 11Y, by means of stepping switch 221, causes a sequence of pairs of pulses to be transmitted along horizontal wires 1X through 7X to the frequency switches comprising pnpn transistors Q30 through Q36, which are in turn associated in a manner to be described with output circuit 222.

Output current from write circuit 217 is also applied to the base of transistor Q29 in start circuit 226. Transistor Q29 turns on and in turn applies a starting signal by way of resistor R192 and diode D120 to conventional flip-flop circuit 227, which comprises transistors Q27, Q28 and associated circuit components. Transistor Q28 is turned off, enabling controlled multivibrator 228 which comprises transistors Q23 and Q24 and their associated circuit components. Multivibrator 228 supplies two-phase pulses to conventional ferrite core stepping switch 221 by way of a core driver circuit 225 which comprises pnpn transistors Q21 and Q22. Core drivers Q21 and Q22, in response to the voltage changes generated by multivibrator 228, provide the necessary current pulses for operating stepping switch 221. At the end of a complete stepping sequence of stepping switch 221, a signal is applied from position 12 to the base of transistor Q20 in stop circuit 220, turning transistor Q20 on. Transistor Q20 turning on applies a signal to the base of transistor Q3 in OR gate 213, turning transistor Q3 off, which action initiates system release in the manner previously described.

In order to ensure that all cores in memory 110 and in stepping switch 221 are set at the reset position, both memory 110 and stepping switch 221 are reset at the beginning of each operation. As transistor Q4 in the one second time-out circuit 208 turns off at the start of timing, the collector will rise and positive voltage is applied to the base of transistor Q18 in memory reset circuit 218 and also to transistor Q19 in switch reset circuit 219. This positive voltage causes transistor Q18 to conduct, discharging capacitor C106 through crosspoint element CP2, resetting the cores of memory 110. Similarly, the positive voltage described causes transistor Q19 to conduct, discharging capacitor C110 through crosspoint CP4, resetting the cores of stepping switch 221. The function of crosspoints CP2 and CP4 is to prevent premature or spurious turn-on of transistors Q18 and Q19.

Controlled multivibrator 228 has a second function in that both phases of its output are applied as an actuating signal to operate pulsed power supply 224 which comprises a monostable multivibrator utilizing transistors Q25, Q26 and associated circuit components. Pulses from power supply 224 operate pnpn switches Q30 through Q36, which supply current for the excitation of the tuned circuits employing capacitors C119 and C120 and tapped inductors LCL and LCH. These power pulses are applied by way of diode D122 and resistors R193 and R194. As indicated above, the particular frequency of each output signal generated in both the high band and in the low band is determined by the conducting state of pnpn switching transistors Q34 through Q36 (high band) and transistors Q30 through Q33 (low band). As previously described, the conducting state of these frequency switches is established by the output from memory 110. The length of time for which these switches conduct is determined by resistor R180 and capacitor C118 of the pulsed power supply 224. The "on" time on the switches in turn determines the duration of the multifrequency output tones.

To promote both clarity and brevity in the foregoing detailed circuit descriptions, mention of specific functions performed by individual circuit components has been omitted in those instances wherein such functions are fully evident to persons skilled in the art. To ensure completeness of disclosure, however, all required individual circuit components are shown in the drawing.

It is to be understood that the embodiment described herein is illustrative of the principles of the invention. Various modifications may be devised by persons skilled in the art without departing from the spirit and scope of the invention.

What is claimed is:

1. A centralized repertory telephone system comprising, in combination, a plurality of telephone sets each including means for generating coincident distinctive pairs of multifrequency signals, a central switching point, centralized repertory means including magnetic core storage means for storing a plurality of directory numbers, a plurality of means each responsive to an OFF-HOOK condition on a corresponding one of said sets for establishing a connection between said last named set and said storage means, means responsive to the operation of one of said connection establishing means for disabling all other of said connection establishing means, means responsive to a particular multifrequency signal from any one of said sets for completing a connection between said last named set and said central switching point by way of said repertory means, said repertory means further including means responsive to a multifrequency signal from one of said sets corresponding to a digit for extracting signal indicia of a complete directory number from said storage means, means responsive to said signal indicia for generating a plurality of pairs of coincident multifrequency signals each corresponding to a particular digit of said directory number, and means for applying said last named signals to said central switching point.

2. A centralized repertry telephone system comprising, in combination, a plurality of telephone sets each including means for generating coincident distinctive pairs of multifrequency signals, central storage means including an array of magnetic cores having a plurality of directory numbers stored therein in terms of a plurality of groups of said cores, each of said groups being uniquely threaded by a respective one of a group of conducting leads, first means responsive to a particular one of said pairs of signals from one of said sets for changing the magnetic state of all of said cores threaded by a respective one of said leads, second means responsive to said last named particular one of said pairs of signals for applying sucessive interrogating pulses to said lead thereby to generate direct current space division output signals indicative of said directory number, and means responsive to said last named signals for generating coincident pairs of multifrequency signals indicative of said directory number and for applying said last named signals to a telephone line.

3. Apparatus in accordance with claim 2 including means automatically operative after the operation of said last named generating means for resetting all of said cores threaded by said last named lead to their initial magnetic state.

4. Apparatus in accordance with claim 2 wherein said first means includes a plurality of groups of relays, a combination of one of said relays from each of said groups being operatively responsive to a corresponding one of said multifrequency signal pairs, thereby to complete an electrical circuit including a corresponding one of said conducting leads, and means for generating and applying a pulse to said last named conducting lead thereby to effect said changing of magnetic state.

5. Apparatus in accordance with claim 2 wherein said second means includes stepping switch means for applying one of said interrogating pulses, in succession, to each portion of one of said groups of cores that includes the cores common to one of said leads, said portion of said cores being indicative of one digit of the directory number identified by said last named lead.

6. In a centralized repertory telephone system including a plurality of telephone sets, apparatus comprising, in combination, common storage means for storing a plurality of directory numbers therein, means responsive to an off-hook condition on any of said sets for completing a connection between said last named set and said storage means, means responsive to the generation of a dial signal from said last named set indicative of a directory digit for releasing said connection, means responsive after a first preselected time interval following the inception an off-hook condition on said last-named set for releasing said connection, means responsive to the generation by said last named set of a multifrequency signal other than a signal indicative of a digit for inhibiting the operation of said last named means, means operative after a second preselected interval exceeding said first interval in the absence of said inhibiting signal and in the absence of a dial tone signal for releasing said connection, means responsive to said last named multifrequency signal, followed by a dial signal from said last named set indicative of a digit, for extracting a corresponding one of said directory numbers from said storage means in terms of electrical signals, means operative upon the completion of operation by said extracting means for releasing said connection, and means responsive to a change in condition of said last named set from off-hook to on-hook for releasing said connection.

7. A centralized repertory telephone system comprising, in combination, a plurality of telephone sets each including means for generating coincident pairs of multifrequency signals, centralized repertory storage means including an array of magnetic cores for storing unique groups of directory numbers, means responsive to a first pair of said signals from a particular one of said sets for providing said last named set with access to a particular one of said unique groups of directory numbers, and means operative after the operation of said access providing means and responsive to a second pair of said signals from said last named set for applying to a telephone line a group of coincident pairs of tone signals indicative of a preselected one of said directory numbers.

8. In a centralized repertory telephone system including a plurality of telephone sets, with a common central office, each having means for generating a distinctive multifrequency signal indicative of each dial digit and one additional signal, common means for storing a plurality of directory numbers, a plurality of line circuits each associated with a particular one of said sets, common circuit means for exercising supervisory control over and for providing access to said storing means, means including one of said line circuits and said common circuit means responsive to one of said additional signals for establishing a connection between one of said sets and said central office by way of said common means, each of said line circuits including means responsive to the establishment of a connection between one of said sets and said storing means for precluding access to said storing means by any other of said sets, means including said common circuit means responsive to the application of one of said multifrequency signals for extracting one of said directory numbers from said storing means in terms of a plurality of successive pairs of space division D-C outputs, and means responsive to said outputs for generating and applying corresponding multifrequency signals to said central office.

9. Apparatus in accordance with claim 8 wherein said generating means comprises a plurality of tuned circuits and a plurality of solid state switching devices, a respective pair of which are responsive to each one of said pairs of D-C outputs for establishing circuit connections for a corresponding pair of said tuned circuits whereby said last named tuned circuit pair is enabled to generate a final multifrequency output signal corresponding to one of said stored directory numbers.

10. Apparatus in accordance with claim 8 wherein said storing means comprises a magnetic core array.

11. In a centralized repertory telephone system including a plurality of telephone sets each including means for generating a multifrequency control signal and multifreqeuncy dial signals apparatus comprising, in combination, common repertory storage means including an array of magnetic cores, said array having multidigit directory numbers stored therein in terms of leads uniquely threaded through selected ones of said cores, first means responsive to an off-hook condition at any one of said sets for completing a connection between said one set and said storage means, second means responsive to one of said control signals for completing a connection from one of said sets to a central office by way of said storage means, means responsive to one of said dial signals from one of said sets following said control signal from said last named set for extracting a directory number from said storage means in terms of a sequence of pairs of space division D-C outputs, and means for translating said D-C outputs into multifrequency outputs.

12. Apparatus in accordance with claim 11 wherein said first means comprises a line circuit corresponding to each of said sets, each of said line circuits also being responsive to an off-hook condition on its corresponding set thereby to deny access to said storage means by any other of said sets.

13. Apparatus in accordance with claim 11 wherein said extracting means comprises means for magnetically setting the group of said cores threaded by a particular one of said leads and means for pulsing in succession each subgroup of said last named group, each of said subgroups including only those cores corresponding to a particular digit of a stored directory number, one of said pairs of D-C outputs being generated in response to the pulsing of each of said subgroups.

14. Apparatus in accordance with claim 11 wherein said translating means includes a plurality of tuned circuits and solid state switching device means responsive to said D-C outputs for selectively connecting corresponding ones of said tuned circuits as multifrequency signal generating circuits.

15. Apparatus in accordance with claim 11, including means responsive to one of said dial signals when not immediately preceded by one of said control signals for disabling said first means, means responsive after a first preselected time interval following the inception of an off-hook condtion on said last named set for disabling said first means, means responsive to the generation by said last named set of one of said control signals for inhibiting the operation of said last named disabling means, means operative after a second preselected interval exceeding said first interval in the absence of operation of said inhibiting means and in the absence of a dial tone signal for disabling said first means, means operative following the operation of said extracting means for disabling said first means, and means responsive to a change in condition of said last named set from off-hook to on-hook for disabling said first means.

No references cited.

KATHLEEN H. CLAFFY, *Primary Examiner.*

WILLIAM C. COOPER, *Examiner.*